United States Patent
Cabalquinto

[19]

[11] Patent Number: 5,940,991
[45] Date of Patent: *Aug. 24, 1999

[54] NON-PLANAR ARTICLE FORMED FROM THERMOPLASTIC COMPOSITE MATERIAL AND METHOD OF FORMING NON-PLANAR ARTICLE

[75] Inventor: Santiago C. Cabalquinto, Northridge, Calif.

[73] Assignee: Performance Materials Corporation, Camarillo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/746,205

[22] Filed: Nov. 6, 1996

Related U.S. Application Data

[62] Division of application No. 08/418,799, Apr. 7, 1995.

[51] Int. Cl.⁶ .............................. A43B 1/14; A43B 5/04; A43B 23/00
[52] U.S. Cl. ..................................... 36/98; 36/87; 36/115
[58] Field of Search .................................. 36/115, 114, 4, 36/98, 87, 45; 264/257, 244

[56] References Cited

U.S. PATENT DOCUMENTS

| | | | |
|---|---|---|---|
| 2,978,376 | 4/1961 | Hulse | 264/257 |
| 4,107,856 | 8/1978 | Bourque | 36/115 |
| 4,509,276 | 4/1985 | Bourque | 36/115 |
| 4,778,717 | 10/1988 | Fitchmun | 428/246 |
| 5,164,240 | 11/1992 | Burgess | 427/246 |
| 5,390,430 | 2/1995 | Fitchmun et al. | 36/30 R |
| 5,401,564 | 3/1995 | Lee et al. | 36/44 |
| 5,437,466 | 8/1995 | Meibock et al. | 36/115 |

*Primary Examiner*—Paul T. Sewell
*Assistant Examiner*—Anthony Stashick
*Attorney, Agent, or Firm*—Ellsworth R. Roston; Fulwider Patton, et al.

[57] ABSTRACT

A thermoplastic composite material is formed from a fabric, preferably woven, impregnated and preferably covered with a thermoplastic material (e.g. acrylic) constituting a monomer solvent and polymer mixture preferably in an approximately 2:1 ratio. The monomer changes the polymer viscosity to wet the fabric. The mixture contains small amounts of an initiator (e.g. benzoyl peroxide) for promoting the monomer polymerization and an inhibitor (e.g. hydroquinone) for preventing premature curing. Plastic sheets on the thermoplastic composite material inhibit the curing. An activator (e.g. tertiary amine) preferably applied to the material surface initiates the material curing at ambient temperatures when the plastic sheets are removed. To reproduce an article from a three-dimensional mold, the mold is disposed on a platform. After removing the plastic sheets, the thermoplastic composite material is disposed on the mold. A shroud (e.g. elastic sheet) disposed over the composite material is sealingly attached to the platform. A vacuum produced at ambient temperatures through the platform collapses the shroud against the composite material which in turn collapses against a male mold and cures as it collapses. A female mold having the male mold shape and disposable over the composite material shapes the composite material after such material has been collapsed against the male mold. Articles of complex or highly contoured shape (e.g. a base portion of a boot for ice skates or in-line roller skates or a helmet shell) may thus be formed.

12 Claims, 2 Drawing Sheets

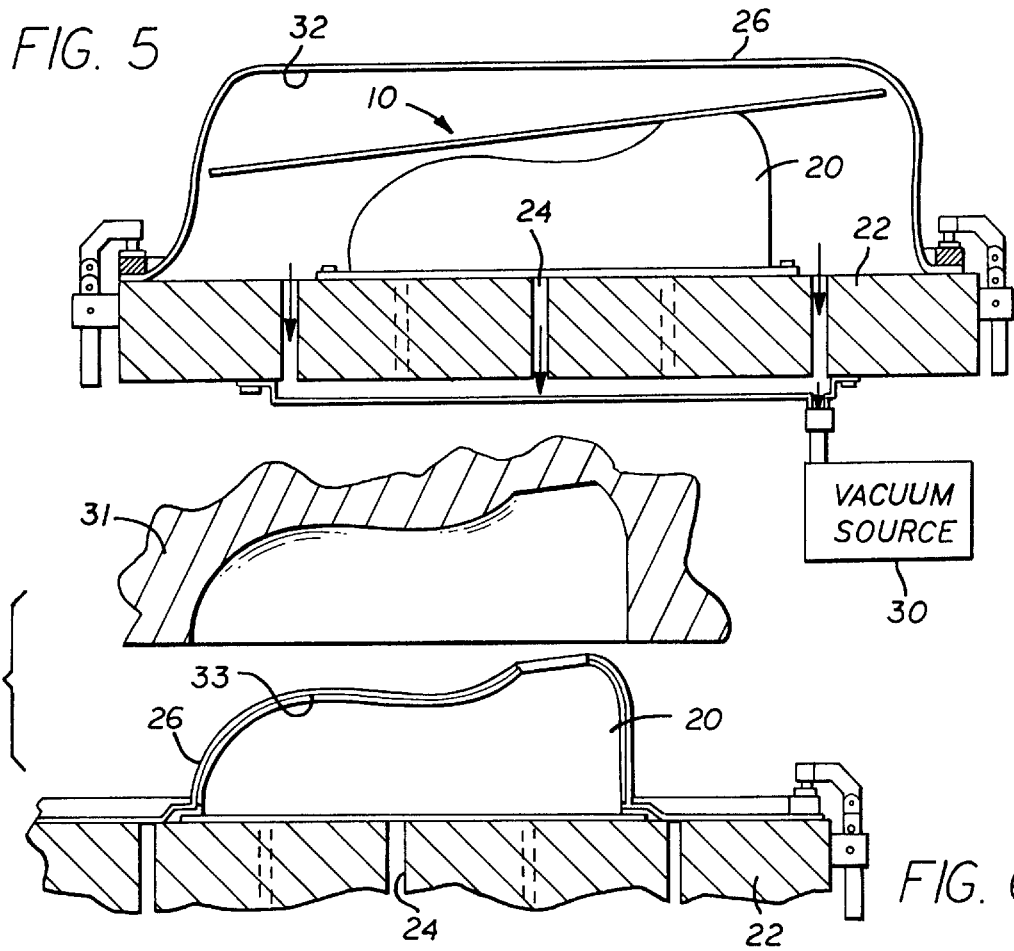
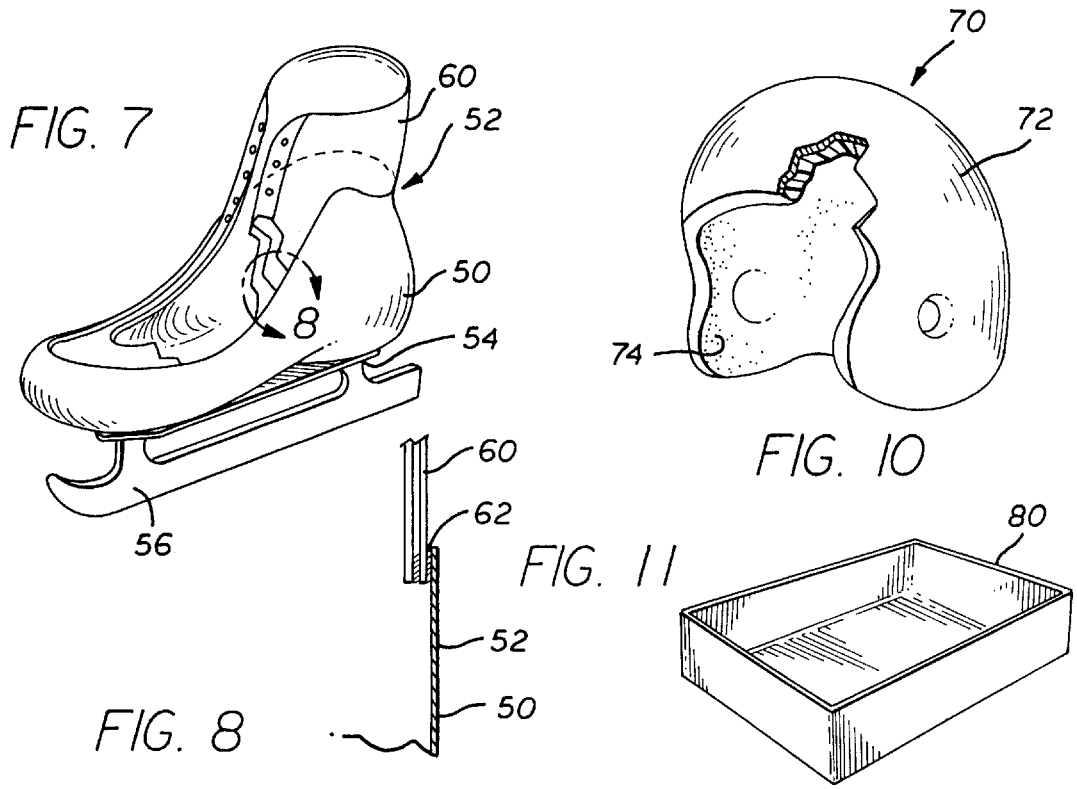

NON-PLANAR ARTICLE FORMED FROM THERMOPLASTIC COMPOSITE MATERIAL AND METHOD OF FORMING NON-PLANAR ARTICLE

This is a division of application Ser. No. 08/418,799, filed Apr. 7, 1995.

This invention relates to a method of forming a sheet of a thermoplastic composite material into an article of a highly contoured or complex shape without any wrinkles in the article. More particularly, the invention relates to a method of conforming a sheet of a thermoplastic composite material to the shape of a mold, preferably at ambient temperatures, while the thermoplastic composite material is curing. The invention also relates to articles formed by such method, to the thermoplastic composite material before the curing, to the thermoplastic composite material produced after the curing and to the articles produced by the method of this invention.

BACKGROUND OF THE INVENTION

In recent years, thermoplastic composite materials have been provided to form articles. For example, such a thermoplastic composite material is disclosed in U.S. Pat. No. 4,778,717, issued to Douglas Fitchmun on Oct. 18, 1988, for a "Thermoplastic Thermoformable Composite Material" and assigned of record to the assignee of record in this application. The thermoplastic composite material in U.S. Pat. No. 4,778,717 is formed from a thermoplastic core and from layers of a fabric impregnated and covered with a thermoplastic material. Such fabric-coated material is bonded to the core to form the thermoplastic composite material.

Subsequently a simplified thermoplastic material was developed by applicant's assignee. This simplified thermoplastic composite material also included a fabric impregnated and covered with a thermoplastic material. However, it eliminated the thermoplastic core and the second layer of fabric on the other side of the core. It may be formed from a single layer of the fabric impregnated and covered with the thermoplastic material or it may be formed from a plurality of such layers.

The materials discussed in the previous paragraphs have several advantages. They are light in weight but strong. They can be shaped in a desired three-dimensional representation by the application of heat to the thermoplastic composite material and the disposition of the heated material on a mold of the desired shape. If the shape is imperfect, the thermoplastic composite material can be heated and reshaped again.

The materials discussed in the previous paragraphs have certain disadvantages. One disadvantages is that the thickness of the material is not uniform at different positions on the article if such uniformity is desired when the material is formed into complex three-dimensional shapes. Another disadvantage is that the materials tend to wrinkle when they have to be shaped into a complex pattern. This is undesirable when the shaped piece has to have a smooth appearance without wrinkles. It is also not desirable from a structural standpoint. For example, the shaped piece should be free of wrinkles when it constitutes the shell of a helmet. The shaped piece should also be free of wrinkles when it constitutes the base portion (extending approximately to the ankles) of footwear which is worn by a skater, particularly when the footwear is for an ice skate or a skate with in-line rollers. The materials discussed above have also been disadvantageous because they have had to be shaped at elevated temperatures.

The problems discussed in this paragraph have been in existence for some time. Attempts have been made to resolve such problems but without much success. Products formed from thermoplastic composite materials with complex shapes have not had a uniform thicknesses when desired or have not been provided with specified thickness at different positions. Furthermore, the products have been wrinkled even when formed at elevated temperatures.

This invention provides a method of forming, at ambient temperatures, articles of complex shape without wrinkles even when the articles have complex shapes or are highly contoured. Furthermore, the articles can be formed with specified (non-uniform or uniform) thicknesses at different positions. This invention also relates to the thermoplastic composite materials before the curing, to the thermoplastic composite materials after the curing, and to articles formed from such thermoplastic composite materials by such methods.

BRIEF DESCRIPTION OF INVENTION

In one embodiment of the invention, a thermoplastic composite material is formed from a fabric, preferably woven, impregnated and preferably covered with a thermoplastic material (e.g. acrylic) constituting a mixture of a monomer and a polymer, preferably in an approximately 2:1 ratio. The monomer changes the polymer viscosity of the polymer to the fabric. The mixture contains small amounts of an initiator (e.g. benzoyl peroxide) for promoting the monomer polymerization and an inhibitor (e.g. hydroquinone) for preventing curing in storage. Plastic sheets on the opposite surfaces of the thermoplastic composite material inhibit the curing. An activator (e.g. a tertiary amine) preferably applied to the surface of the thermoplastic material initiates the curing of the thermoplastic composite material at ambient temperatures when the plastic sheets are removed.

To reproduce an article from a three-dimensional mold, the mold is disposed on a platform. After removing the plastic sheets, the thermoplastic composite material and is disposed on the mold. A shroud (e.g. an elastic sheet) disposed over the thermoplastic composite materials is sealingly attached to the platform. A vacuum produced at ambient temperatures through the platform collapses the shroud against the composite material which in turn collapses against a male mold. The thermoplastic material cures as it collapses. A female mold having the shape of the male mold and disposable over the composite material shapes the thermoplastic composite material after such material has been collapsed against the male mold.

Articles of complex or highly contoured shape (e.g. a base portion of a boot for ice skates or in-line roller skates or a helmet shell) may be formed by this method.

BRIEF DESCRIPTION OF DRAWINGS

In the drawings:

FIG. 5 is a schematic sectional view of the thermoplastic composite material with the covering sheets removed and of apparatus including a male mold for operating on the thermoplastic composite material to shape the material to conform to the external contour of the male mold;

FIG. 6 is a fragmentary view, similar to that shown in FIG. 5, of the article formed by the apparatus shown in FIG. 5 and also shows a female mold conforming to the shape of the male mold for finally shaping the molded article;

FIG. 7 is a schematic perspective view of an ice skate having a base portion formed by the apparatus shown in FIG. 5;

FIG. 8 is an enlarged sectional view of a portion of the ice skate shown in FIG. 7 and particularly shows the base portion of the ice skate and a binding portion attached to the base portion at the upper end of the base portion;

FIG. 10 is a schematic perspective view, partially broken away, of a helmet having a shell formed by the apparatus shown in FIG. 5; and FIG. 11 is a perspective view of a box formed by the apparatus shown in FIG. 5.

DETAILED DESCRIPTION OF INVENTION

Figure 1:
FIG. 1 is a schematic block diagram of a method for activating the curing of a thermoplastic material which is included in a thermoplastic composite material and which is used in the method constituting this invention to form articles constituting this invention.
Figure 2:
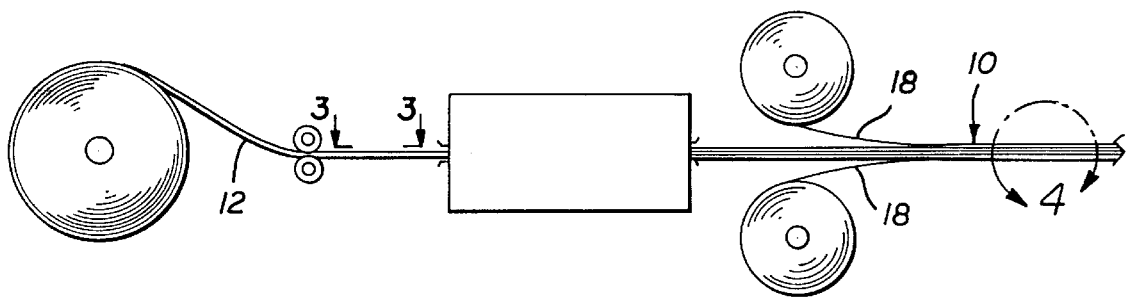
FIG. 2 is a schematic diagram illustrating the formation of the thermoplastic composite material and the covering of the thermoplastic composite material to prevent the thermoplastic material from curing until it is desired to use the thermoplastic composite material.
Figure 3:
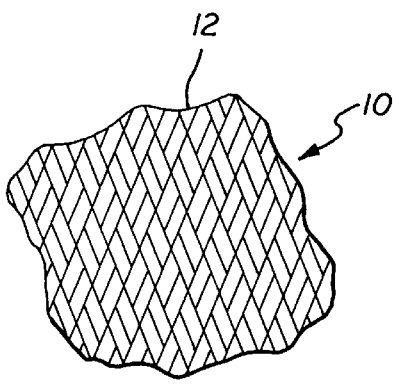
FIG. 3 is an enlarged fragmentary sectional view taken substantially on the line 3—3 of FIG. 2 and illustrates the construction in additional detail of a fabric preferably included in the thermoplastic material.
Figure 4:
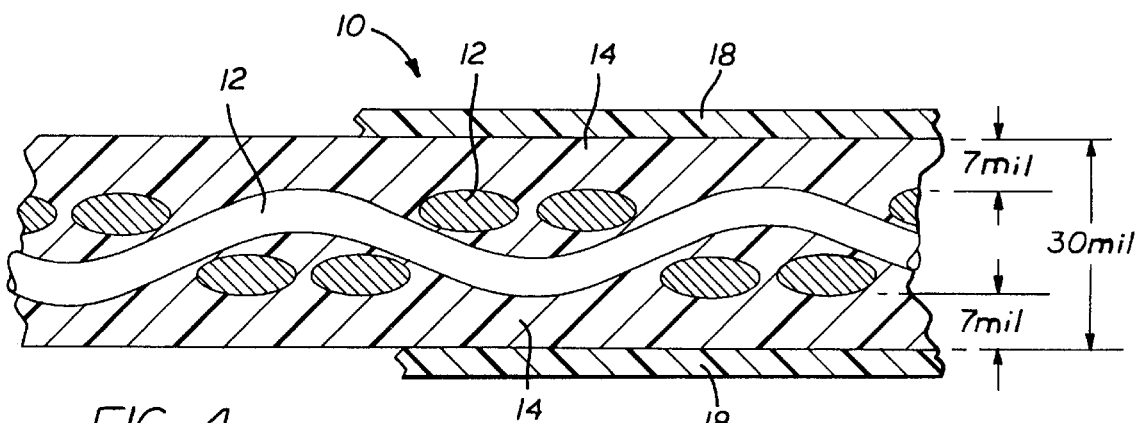
FIG. 4 is an enlarged fragmentary sectional view, taken within the circle 4 of FIG. 2, of the thermoplastic composite material and covering sheets for such material.

In one embodiment of the invention, a thermoplastic composite material generally indicated at 10 (FIG. 2) is provided. The thermoplastic composite material 10 includes a fabric 12 (FIGS. 2–4) and a thermoplastic material 14 impregnating the fabric and covering the fabric 12 on the opposite sides of the fabric. The fabric 12 may illustratively provided with a thickness of about sixteen mils (0.016") and the thermoplastic material 14 may be illustratively provided with a thickness of approximately seven mils (0.007") on each of the opposite surfaces of the fabric. This causes the thermoplastic composite material 10 to have a resultant thickness of approximately thirty mils (0.030").

The fabric material 12 may preferably be formed from a material such as a graphite, glass or aramid. Any type of fabric material 12 may be used. The fabric material 12 may have a warp and a fill with the fill formed from the same material as, or a different material than, the warp. Carbon strands are advantageous because they provide a high resilience and strength. The fabric material 12 may be preferably provided with a double twill formed by the strands in each direction. In a double twill, the fabric in each direction extends two (2) over and then two (2) under the strands in the other direction. Preferably each strand is displaced by one (1) from the adjacent strands extending in the same direction. Preferably each strand is formed from approximately twelve thousand (12,000) fibers. However, other types of fabric material 12 may also be used.

The thermoplastic material 14 may preferably constitute a resin such as an acrylic. However, other thermoplastic materials may also be used. In impregnating the fabric material 12, the thermoplastic material fills the voids between the successive strands of the warp and the fill. The thermoplastic material 14 may include a mixture of a monomer and a polymer. For example, the monomer may constitute methylmethacrylate and the polymer may constitute polymethylmethacrylate. The monomer may constitute a solvent and the polymer may constitute a solid such as in the form of small beads.

The inclusion of the polymer in the mixture causes the beads of the polymer to be dissolved in the monomer and to make the resultant mixture viscous. The monomer changes the viscosity of the polymer to provide the wetting of the fabric. The polymer may preferably constitute approximately one (1) part by weight in the mixture to two (2) parts by weight of the monomer although other proportions of the monomer and the polymer may also be used.

An initiator is preferably included in the thermoplastic mixture for promoting the monomer polymerization. The initiator may be a suitable material such as benzoyl peroxide. The initiator may be preferably included in the mixture at a suitable percentage such as approximately 0.733% by weight of the mixture. Other initiators such as other peroxides may be used instead of benzoyl peroxide. Initiators such as benzoyl peroxide are known in the art. They cause the double bondage between carbon atoms in the monomer to change to a single bondage between the carbon atoms, thereby promoting the polymerization of the monomer and the combination of such polymerization with the polymer in producing long carbon chains with single bonds.

An inhibitor is also preferably included in the mixture. The inhibitor delays the polymerization of the monomer and thereby prevents premature curing of the thermoplastic material. For example, by including the inhibitor, the polymerization may occur over a period of approximately twenty (20) to twenty five (25) days. The inhibitor may preferably constitute a hydroquinone although other materials may also be used. The inhibitor may be included in the mixture in a percentage of approximately 0.0034% by weight of the monomer. Inhibitors such as hydroquinone are known in the art.

Applicant also includes an activator such as a tertiary amine. The tertiary amine may preferably constitute dimethyl trichloroamine. However, other tertiary amines may also be used. The tertiary amine may be included in the mixture in a percentage of approximately ten percent (10%) by weight of the monomer. However, the tertiary amine is preferably applied to the thermoplastic material 14 by brushing it on the surface of the thermoplastic material. An activator such as a tertiary amine is not known in the art, particularly in the environment discussed subsequently. The application of the tertiary amine by applying it to the surfaces of the thermoplastic composite material is also not known in the art. The activator initiates the curing of the thermoplastic composite material 10 at ambient temperatures.

As will be appreciated, the thermoplastic mixture is active if exposed. Furthermore, the monomer will tend to evaporate if the thermoplastic material is exposed. To prevent these undesirable events from occurring, both sides of the thermoplastic composite material are individually covered by sheets 18 which prevent the thermoplastic material from being exposed to the air. For example, these sheets may be made from a polyethylene material. These sheets may be removed from the thermoplastic composite material when it is desired to form the material into a three-dimensional article.

When it is desired to produce an article from a male mold 20 (FIG. 5), the mold is disposed on a platform 22 having apertures 24 to provide for the production of a vacuum. The mold 20 may be made from a suitable material such as polyethylene. The plastic sheets 18 are then removed from the surfaces of the thermoplastic composite material 10. The thermoplastic composite material 10 is then disposed over the mold 20. A sheet 26 made from a suitable elastic material such as polyethylene is then disposed over the thermoplastic composite material 10 and is attached to the platform 22 to provide a sealing relationship between the sheet and the platform.

A vacuum is then provided from a source 30 through the apertures 24 in a chamber 32 defined by the sheet 26 and the platform 20. This vacuum is produced at ambient temperatures. The vacuum produces a differential pressure on the sheet 26 and causes the sheet to collapse on the thermoplastic composite material 10. The thermoplastic composite material in turn collapses on the mold 20 to form a three-dimensional article. The article may have a complex shape. As the thermoplastic composite material 10 collapses on the mold 20, the material becomes cured to the polymeric state.

The curing of the thermoplastic composite material 10 is facilitated by the action of the atmospheric pressure against the sheet 26 in increasing the rate of polymerization of the thermoplastic composite material 10. This causes an increased amount of the monomer to be retained within the thermoplastic composite material. This enhances the production of an article with a uniform composition over the area of the thermoplastic composite material 10. The time for the thermoplastic material 14 to be cured is also decreased because the heat generated by the curing is retained by the sheet 26 within the chamber 32. All of these interactions also insure that the thermoplastic composite material 10 will adopt the shape of the mold 20.

After the thermoplastic composite material 10 has been substantially collapsed on the mold 20 but before the material has been fully cured, a female mold 31 may be disposed on the thermoplastic composite material to conform the shape of the material to the shape of the female mold. The internal shape of the female mold 31 preferably conforms to the external shape of the male mold 20. In this way, an article 33 (FIG. 6) having a unique shape can be produced.

Figure 9:
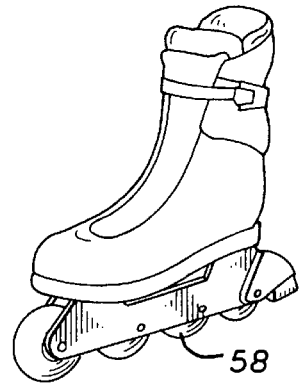
FIG. 9 is a schematic perspective view of a roller skate, with in-line rollers, having a base portion formed by the apparatus shown in FIGS. 5 and 6.

The thickness of the article 33 formed from the thermoplastic material does not have to be uniform. For example, additional layers of the thermoplastic composite material 10 can be added at strategic positions to the article 33 to strengthen the article at these positions. This will be seen subsequently from the discussion of the skate shown in FIGS. 7–9.

After the article 33 has been formed from the thermoplastic composite material 10, it may be reshaped at isolated positions by heating the material at these positions and applying a force at these positions while the material is still hot. In this way, any slight discrepancies in the shape of the thermoplastic composite material 10 from the shapes of the molds 20 and 31 may be corrected without having to discard any of the material such as would occur if thermosetting material were used.

The material forming the article 33 is different from the material which is used in the prior art such as in U.S. Pat. No. 4,778,717. This results from the inclusion of the activator such as the tertiary amine. This activator remains in the thermoplastic composite material 10 even as the material polymerizes as it cures.

The method described above is advantageous from an environmental standpoint. This results from the fact that the vapors generated during the low temperature curing operation are retained within the chamber 32 or exhausted by the source 30. The method is also advantageous because it does not require any heat to be provided. This tends to minimize cost.

The article 33 formed by the method described above has certain important advantages. The article 33 has no wrinkles. This is particularly important when the external surface of the article 33 has to have an aesthetic appearance. It is also important from a structural standpoint. The article 33 is light and strong, particularly in comparison to articles formed by competitive materials. The article 33 is also advantageous since it distributes any force of an impact over an extended area of the article. The article 33 is also advantageous because it can be reshaped after it has been formed.

It will be appreciated that many different articles can be made by the method described above. These articles are in themselves unique over the prior art. For example, FIG. 7 shows the base portion 50 of a shoe generally indicated at 52 and made by the method described above. This shoe may be used for various types of sports such as ice skating and roller skating. The base portion 50 may snugly support the bottom of a wearer's foot to an upward position approximating the wearer's ankle. The wearer's foot may fit snugly in the base portion 50 and may have a smooth appearance without any wrinkles, thereby providing the base portion with an aesthetic appearance.

The base portion 50 may be reinforced at strategic positions on the base portion. This is indicated schematically at 52 in FIG. 8. This reinforcing may be provided by disposing additional layers of the thermoplastic composite material 10 at such strategic positions. For example, such additional layers may be disposed at the positions of the wearer's ankles to provide additional support for such ankles and prevent the ankles from twisting. Additional layers may also be provided at the bottom of the base portion. The additional layers may be provided while the base portion 50 is being formed as by the method described above. Alternatively, the additional layers may be formed subsequently to the formation of the base portion 50 as by heating the base portion at strategic portions and heating the additional layers and then applying the additional layers to the base portion while the additional layers and the base portion are still hot at these strategic positions.

A support 54, preferably metallic, may be suitably attached to the bottom of the base portion 50. A blade 56 as for ice skating may be attached to the support 54. Alternatively, rollers 58 (FIG. 9) as for in-line roller skates may be suitably attached to the support 54. A binding 60 may be suitably attached to the base portion 50 at the upper end of the base portion. The binding 60 may encase the wearer's foot at positions above the ankle. The binding 60 may be made from a suitable material such as leather. The binding 60 may be made from several layers of a material such as leather and may be suitably adhered to the base portion 50 as indicated at 62 in FIG. 8.

The materials used in the prior art for the base portion of skates have had several disadvantages. Some of the materials previously used have been thermosetting. These materials have been disadvantageous because they have been relatively heavy and because they cannot be re-shaped after they have been cured. Several layers of leather have also been used in the prior art for the base portions of skates. Skates having base portions formed from leather have been approximately one half of a pound (½ lb.) heavier than those formed from the thermoplastic composite material 10 as described above.

Considering that each skate weighs about six pounds (6 lb.), a savings of approximately one half pound (½ lb) in weight is significant. When the skates are on the wearer's feet, this weight difference may appear to the wearer to be sizable. When the other advantages of applicant's skates are also considered, there is a considerable advantage in applicant's skates over the prior art. As described above, these include the strength, hardness, distribution of force of impact and aesthetics of applicant's shoes in comparison to the shoes of the prior art.

Another example of an article made from the method described above may constitute a helmet generally indicated at 70 in FIG. 10. The helmet may include an outer shell 72 of a thermoplastic composite material fabricated as described above. A liner 74 made from a suitable material such as styrofoam may be suitably attached to the inner surface of the shell 72. The liner 74 preferably has a contour corresponding substantially to the contour of the shell. The shell 72 is advantageous because it is hard, strong and light and because it effectively distributes throughout an extended area any impact at a localized position. The liner 74 is advantageous because it absorbs to a significant extent any force imposed on the shell 72 before the force reaches the wearer's head.

FIG. 11 illustrates a box 80 made by the apparatus shown in FIG. 5. As will be seen, the box 80 is substantially rectangular with sharp or slightly rounded corners. The box 80 may be constructed so that the thickness is substantially uniform at every position of the box including the corners. The box 80 has all of the advantages discussed above for the skates shown in FIGS. 7–9 and the helmet shown in FIG. 10. For example, it is light in weight and hard. It is also wrinkle-free and has a substantially uniform thickness.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination in footwear for holding and supporting a wearer's foot,
   a base portion made from a cured thermoplastic composite material and having a bottom surface and shaped and constructed to be wrinkle-free and to envelope a wearer's foot in a snug relationship between the bottom surface of the base potion and positions around the wearer's ankle, the base portion extending in an integral relationship from a position supporting the bottom of the wearer's foot to the positions around the wearer's ankle, and
   an upper portion attached to the base portion and extending upwardly from the base portion,
   the thermoplastic composite material in the base portion consisting of a woven fabric impregnated and covered on each of its opposite surfaces with a cured thrmoplastic material and providing a hard and light and snug envelopment of the wearer's foot between the bottom surface of the base portion and the positions around the wearer's ankle.

2. In a combination as set forth in claim 1,
   the thermoplastic material in the base portion constituting a polymethylmethacrylate.

3. In a combination as set forth in claim 1,
   the base portion being formed from a single layer of the thermoplastic composite material, at least an additional layer of the thermoplastic composite material being integral with the single layer of the thermoplastic composite material at the position of the wearer's ankle to provide a reinforcement for the single layer.

4. In a combination as set forth in claim 1,
   the upper portion being made from a leather and the upper portion being adhered to the base portion at a position near the top of the base portion.

5. In a combination as set forth in claim 1 wherein
   a support is attached to the bottom of the base portion and extends longitudinally along the base portion and wherein
   means are disposed on the support for propelling the wearer's foot along a surface with minimal resistance from such surface.

6. In a combination as set forth in claim 1 wherein
   the base portion is reinforced at approximately the position of the wearer's ankle with at least an additional layer of the cured thermoplastic composite material, the additional layer of the cured thermoplastic composite material being integral with the base portion.

7. In a combination as set forth in claim 4, wherein
   a support is attached to the bottom of the base portion and wherein
   motive means are attached to the support to provide for a movement of the footwear along a surface with a minimal amount of friction.

8. In a combination as set forth in claim 2 wherein
   the thermoplastic composite material in the base portion constitutes only a single layer made from the woven fabric impregnated and covered with the cured thermoplastic material to provide a hard and light envelopment of the wearer's foot between the bottom surface of the base portion and the positions around the wearer's ankle.

9. In a combination as set forth in claim 1 wherein
   the base portion is reinforced at particular positions with additional amounts of the cured thermoplastic composite material, such additional amounts of the cured thermoplastic composite material being integral with the base portion.

10. In a combination as set forth in claim 2 wherein
    the base portion is formed from a first layer of the cured thermoplastic composite material and wherein the base portion is reinforced at the position of the ankle of the wearer's foot by a second layer of the cured thermoplastic composite material and wherein the second layer of the cured thermoplastic composite material is integral with the first layer of the cured thermoplastic composite material.

11. In a combination as set forth in claim 4 wherein
    the base portion is formed from a first layer of the cured thermoplastic composite material and wherein the base portion is reinforced at the position of the ankle of the wearer's foot by a second layer of the cured thermoplastic composite material and wherein the second layer of the cured thermoplastic composite material is integral with the first layer of the cured thermoplastic composite material and wherein the first and second layers of the thermoplastic composite material constitute polymethylmethacrylate and wherein
    a support is attached to the bottom of the wearer's foot and extends longitudinally along the base portion and wherein means are disposed on the support for propelling the wearer's foot along a surface with minimal resistance from such surface.

12. In a combination as recited in claim 5 wherein
the thermoplastic composite material in the base portion constitutes only a single layer made from the fabric impregnated and coated with the cured thermoplastic material to provide a hard and light envelopment of the wearer's foot and wherein the thermoplastic material constitutes polymethylmethacrylate.

* * * * *